(12) United States Patent
Mori et al.

(10) Patent No.: US 8,511,548 B1
(45) Date of Patent: Aug. 20, 2013

(54) METHOD AND SYSTEM FOR PERFORMING CARD-BASED TRANSACTIONS USING A PORTABLE DEVICE

(75) Inventors: Kenichi Mori, Carlsbad, CA (US); Ronald Jason Char, San Diego, CA (US); Justin C. Marr, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 401 days.

(21) Appl. No.: 12/166,642

(22) Filed: Jul. 2, 2008

(51) Int. Cl.
*G06K 5/00* (2006.01)
(52) U.S. Cl.
USPC .......................... 235/380; 235/379; 235/493
(58) Field of Classification Search
USPC .................... 235/379, 380, 382, 449, 493
See application file for complete search history.

(56) References Cited

U.S. PATENT DOCUMENTS

| | | | |
|---|---|---|---|
| 6,315,195 B1 * | 11/2001 | Ramachandran | 235/380 |
| 6,776,332 B2 * | 8/2004 | Allen et al. | 235/380 |
| 6,817,521 B1 * | 11/2004 | Matada | 235/380 |
| 6,910,624 B1 * | 6/2005 | Natsuno | 235/379 |
| 7,340,439 B2 * | 3/2008 | Burger et al. | 705/65 |
| 2003/0004876 A1 * | 1/2003 | Jacobson | 705/41 |
| 2003/0106935 A1 * | 6/2003 | Burchette, Jr. | 235/380 |
| 2004/0169088 A1 * | 9/2004 | Nelms et al. | 235/493 |
| 2004/0188519 A1 * | 9/2004 | Cassone | 235/382 |
| 2005/0269402 A1 * | 12/2005 | Spitzer et al. | 235/380 |
| 2008/0017721 A1 * | 1/2008 | Zehnacker | 235/493 |
| 2008/0126260 A1 * | 5/2008 | Cox et al. | 705/67 |

\* cited by examiner

*Primary Examiner* — Daniel Hess
*Assistant Examiner* — Paultep Savusdiphol
(74) *Attorney, Agent, or Firm* — Park, Vaughan, Fleming & Dowler, LLP; Chia-Hsin Suen

(57) ABSTRACT

Some embodiments of the present invention provide a system that performs card-based transactions. During operation, the system displays a set of magnetic-stripe cards to a user through a user interface of a portable device and obtains a user selection of a magnetic-stripe card from the set of magnetic stripe cards. Next, the system writes magnetic-stripe data associated with the magnetic-stripe card to a rewritable magnetic stripe on the portable device. Finally, the system uses the rewritable magnetic stripe in the card-based transaction in place of the magnetic-stripe card.

35 Claims, 6 Drawing Sheets

METHOD AND SYSTEM FOR PERFORMING CARD-BASED TRANSACTIONS USING A PORTABLE DEVICE

BACKGROUND

Related Art

Embodiments of the invention provide a system for performing card-based transactions using a portable device.

Magnetic-stripe cards, such as identification (ID) cards, club cards, gift cards, credit cards, debit cards, and/or insurance cards may be used in card-based transactions between a variety of individuals, businesses, and organizations. For example, credit cards may be used to purchase goods or services, pay for business expenses, borrow money, and/or donate money to a charitable organization. Along the same lines, an ID card with a magnetic stripe may be used in access control to allow or deny physical access to a particular resource, such as a venue or workplace.

A magnetic-stripe card is typically utilized by reading data stored on a magnetic stripe attached to the magnetic-stripe card. For example, a financial transaction may be conducted by swiping a credit card through a card reader in a point-of-sale system. As the magnetic stripe on the credit card passes through a reading head on the card reader, data encoded on the magnetic stripe is obtained and used to process the financial transaction. Using the example above, the point-of-sale system may read a first and/or second track on the credit card to obtain the account number and expiration date for the credit card. The information obtained from the track(s) may then be used to conduct a credit card transaction using the credit card.

Users of magnetic-stripe cards often carry multiple cards to conduct a variety of card-related transactions. For example, a typical wallet may include one or more debit cards, one or more credit cards, a driver's license, a health insurance card, a gym membership card, an insurance card, a gift card, and/or one or more club cards. However, a large number and assortment of magnetic-stripe cards may be difficult to manage, track, and/or carry. For example, a magnetic-stripe card may be easily misplaced, stolen, and/or worn out. Similarly, the user may be unable to fit more than a certain number of magnetic-stripe cards into a wallet and/or other card-carrying mechanism. Consequently, card-based transactions may be facilitated by techniques for consolidating, managing, and tracking magnetic-stripe cards.

SUMMARY

Some embodiments of the present invention provide a system that performs card-based transactions. During operation, the system displays a set of magnetic-stripe cards to a user through a user interface of a portable device and obtains a user selection of a magnetic-stripe card from the set of magnetic-stripe cards. Next, the system writes magnetic-stripe data associated with the magnetic-stripe card to a rewritable magnetic stripe on the portable device. Finally, the system uses the rewritable magnetic stripe in the card-based transaction in place of the magnetic-stripe card.

In some embodiments, the system also authenticates the user prior to enabling use of the rewritable magnetic stripe in the card-based transaction.

In some embodiments, the user is authenticated using at least one of a password and a biometric signature.

In some embodiments, the user is authenticated based on a level of security associated with the magnetic-stripe card.

In some embodiments, the magnetic-stripe data is obtained from the magnetic-stripe card using a card reader associated with the portable device.

In some embodiments, the card reader is attached to the portable device using a Universal Serial Bus (USB) interface.

In some embodiments, the card-based transaction is a financial transaction.

In some embodiments, the magnetic-stripe card is at least one of a credit card, a debit card, an identification (ID) card, an insurance card, a gift card, an account card, a transportation card, and a club card.

In some embodiments, the portable device is at least one of a mobile phone, a personal digital assistant (PDA), a global positioning system (GPS) receiver, a portable media player, a portable calculator, and a portable computer.

DETAILED DESCRIPTION

Figure 1:
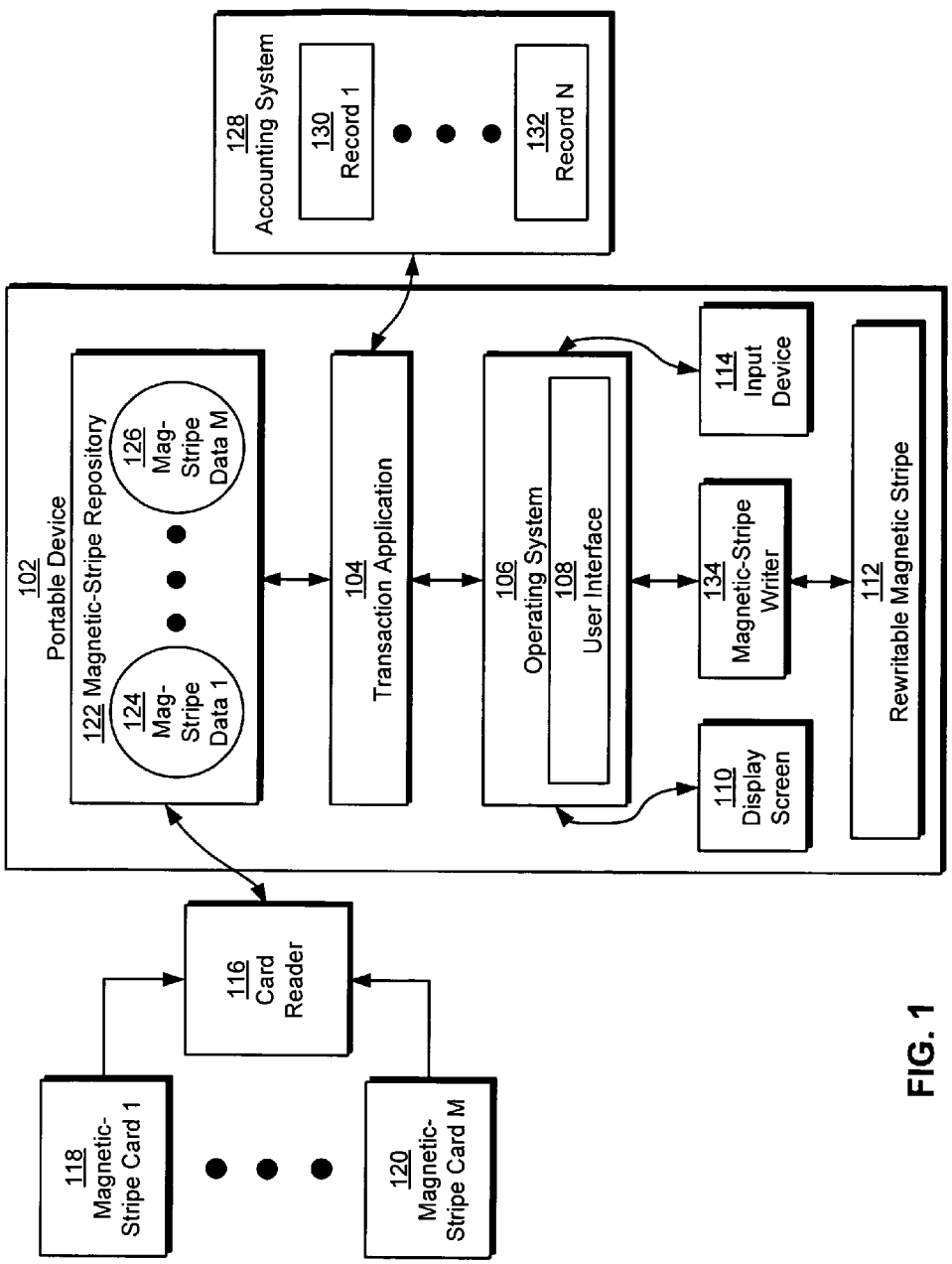
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for performing card-based transactions using a portable device. The portable device may be a mobile phone, a personal digital assistant (PDA), a portable media player, a portable calculator, and/or a portable computer.

To conduct the card-based transactions, magnetic-stripe data from a number of magnetic-stripe cards is stored on the portable device. The magnetic-stripe cards may include credit cards, debit cards, identification (ID) cards, insurance cards, gift cards, account cards, and/or club cards.

The magnetic-stripe data may be obtained from the magnetic-stripe cards using a card reader associated with the portable device. When a user of the portable device wishes to use a particular magnetic-stripe card, the magnetic-stripe data from the magnetic-stripe card is written to a rewritable magnetic stripe within the portable device. The rewritable magnetic stripe may then be used in a card-based transaction in lieu of the magnetic-stripe card.

In one or more embodiments of the invention, the user is authenticated prior to enabling use of the rewritable magnetic stripe in the card-based transaction. The user may be authenticated using a password and/or a biometric signature. Furthermore, the user may be authenticated based on a security level associated with the magnetic-stripe card. The card-based transaction may additionally be recorded in the portable device to allow the user to manage and track card-based transactions (e.g., financial transactions) using the portable device.

FIG. 1 shows a schematic of a system in accordance with an embodiment of the present invention. As shown in FIG. 1, the system includes a portable device 102, a card reader 116, and an accounting system 128. Each of these components is described in further detail below.

Portable device 102 may correspond to a portable electronic device that provides one or more services or functions to a user. For example, portable device 102 may operate as a mobile phone, portable computer, personal digital assistant (PDA), global positioning system (GPS) receiver, portable media player, and/or portable calculator. In addition, portable device 102 may include an operating system 106 that coordinates the use of hardware and software resources on portable device 102, as well as one or more applications (e.g., transaction application 104) that perform specialized tasks for the user. For example, portable device 102 may include applications such as an email client, an address book, a document editor, and/or a media player. To perform tasks for the user, applications may obtain access to hardware resources (e.g., processor, memory, I/O components, etc.) on portable device 102 from operating system 106. Applications may also interact with the user through a hardware and/or software framework provided by operating system 106, as is described below.

To enable interaction with the user, portable device 102 may include one or more hardware input/output (I/O) components, such as display screen 110 and input device 114. Each hardware I/O component may additionally be associated with a software driver (not shown) that allows operating system 106 and/or applications on portable device 102 to access and use the hardware I/O components. Those skilled in the art will appreciate that portable device 102 may include additional I/O components, such as a camera, microphone, speaker, and/or wireless transceiver.

Display screen 110 may be used to display images and/or text to one or more users of portable device 102. In one or more embodiments of the invention, display screen 110 serves as the primary hardware output component for portable device 102. For example, display screen 110 may allow the user(s) to view menus, icons, windows, emails, websites, videos, pictures, maps, documents, and/or other components of a user interface 108 provided by operating system 106. Those skilled in the art will appreciate that display screen 110 may incorporate various types of display technology to render and display images. For example, display screen 110 may be a liquid crystal display (LCD), an organic light-emitting diode (OLED) display, a surface-conducting electron-emitter display (SED), and/or other type of electronic display.

Input device 114 may function as the primary hardware input component of portable device 102. Specifically, input device 114 may allow the user to point to and/or select one or more areas of display screen 110 using a cursor, highlight, and/or other visual indicator. Input provided by the user using input device 114 may be processed by the corresponding software driver and sent to operating system 106 and/or one or more applications (e.g., transaction application 104) as one or more actions.

Input device 114 may receive user input through various methods, including touchscreens, touchpads, buttons, voice recognition, keypads, keyboards, and/or other input methods. In addition, multiple input devices may exist on portable device 102. Operating system 106 and/or applications on portable device 102 may use the input from the input device (s) to perform one or more tasks, as well as update user interface 108 in response. Images corresponding to user interface 108 may be sent by operating system 106 to a screen driver (not shown), which may display the images on display screen 110 as a series of pixels. As a result, the user may interact with portable device 102 by using input device 114 to provide input to operating system 106 and/or applications and receiving output from operating system 106 and/or applications through display screen 110.

In one or more embodiments of the invention, portable device 102 includes functionality to perform card-based transactions. More specifically, portable device 102 may include functionality to perform card-based transactions in place of a set of magnetic-stripe cards (e.g., magnetic-stripe card 1 118, magnetic-stripe card m 120) associated with the user. Magnetic-stripe cards may include credit cards, debit cards, identification (ID) cards, insurance cards, gift cards, account cards, transportation cards, and/or club cards. For example, the magnetic-stripe cards may correspond to cards commonly found in the user's wallet or purse, such as a driver's license, one or more credit cards, one or more debit cards, club cards, gym membership cards, health insurance cards, subway passes, train tickets, and/or other cards that utilize magnetic-stripe technology.

To enable card-based transactions on portable device 102, card reader 116 may be used to obtain magnetic-stripe data (e.g., magnetic-stripe data 1 124, magnetic-stripe data m 126) from the magnetic-stripe cards. In other words, card reader 116 may include a reading head that extracts data encoded on the magnetic-stripe cards when the magnetic-stripe cards are swiped through card reader 116. For example, card reader 116 may extract the user's name, account number, and expiration date from one or more tracks on the magnetic stripe of the user's credit card. Similarly, card reader 116 may obtain the user's name, address, driver's license number, expiration date, birthdate, and/or other identifying information from three tracks on the magnetic stripe of the user's driver's license. Card reader 116 may then transmit the magnetic-stripe data to portable device 102 using a Universal Serial Bus (USB) interface and/or other interface standards. The magnetic-stripe data may be stored in a magnetic-stripe repository 122 in portable device 102 for subsequent retrieval and use.

In one or more embodiments of the invention, card-based transactions are performed using a transaction application 104 on portable device 102. In one or more embodiments of the invention, transaction application 104 obtains magnetic-stripe data (e.g., magnetic-stripe data 1 124, magnetic-stripe data m 126) associated with a magnetic-stripe card (e.g., magnetic-stripe card 1 118, magnetic-stripe card m 120) from magnetic-stripe repository 122. A magnetic-stripe writer 134 on portable device 102 may then write the magnetic-stripe data to a rewritable magnetic stripe 112 on portable device 102. The rewritable magnetic stripe 112 may then be used in a card-based transaction in place of the magnetic-stripe card. For example, the rewritable magnetic stripe may be swiped through a point-of-sale system to purchase goods or services in place of a credit or debit card.

In one or more embodiments of the invention, transaction application 104 includes functionality to display a set of magnetic-stripe cards (e.g., magnetic-stripe card 1 118, magnetic-stripe card m 120) to the user. More specifically, transaction application 104 may display a list of magnetic-stripe cards corresponding to magnetic-stripe cards that have been read by card reader 116 and/or otherwise stored in magnetic-stripe repository 122. To allow the user to view available magnetic-stripe cards, the list may be displayed through user interface 108 by transaction application 104 on display screen 110. Transaction application 104 may then obtain a user selection of a magnetic-stripe card from the displayed list and proceed to write the magnetic-stripe data from the magnetic-stripe card to rewritable magnetic stripe 112 using magnetic-stripe writer 134. User selection of a magnetic-stripe card within portable device 102 is discussed in further detail below with respect to FIG. 2A.

Transaction application 104 may further include functionality to authenticate the user prior to enabling use of rewritable magnetic stripe 112. In particular, the user may be authenticated using a password and/or biometric signature, such as a voice command, fingerprint, and/or retinal scan. Furthermore, the user may be authenticated based on a level of security of the magnetic-stripe card associated with the magnetic-stripe data. For example, a bank card may be associated with a high level of security and require multiple authentication factors, whereas a savings card for a supermarket may require the user's ZIP code, phone number, or no authentication. User authentication prior to performing a card-based transaction using portable device 102 is discussed in further detail below with respect to FIG. 2B.

Those skilled in the art will appreciate the temporary nature of magnetic-stripe data encoded on rewritable magnetic stripe 112 may allow low-coercivity magnetic-stripe writing techniques to be utilized in magnetic-stripe writer 134 and rewritable magnetic stripe 112. However, a high-coercivity magnetic-stripe writer 134 may also be used. In particular, a high-coercivity magnetic-stripe writer 134 may allow rewritable magnetic stripe 112 to be used over longer periods while retaining the same magnetic-stripe data. Similarly, a high-coercivity magnetic-stripe writer 134 may allow one or more detachable magnetic stripes (e.g., blank magnetic-stripe cards) to be inserted into portable device 102 and written with magnetic-stripe data from magnetic-stripe repository 122.

Once rewritable magnetic stripe 112 is written with magnetic-stripe data from the magnetic-stripe card, rewritable magnetic stripe 112 may be repositioned to allow rewritable magnetic stripe 112 to be scanned. In particular, rewritable magnetic stripe 112 may be retractable. In other words, rewritable magnetic stripe 112 may be stored within the body of portable device 102 when rewritable magnetic stripe 112 is not in use. However, when rewritable magnetic stripe 112 is in use, rewritable magnetic stripe 112 may extend out along the side or front of portable device 102.

Those skilled in the art will appreciate that multiple positions of rewritable magnetic stripe 112 with respect to portable device 102 may allow rewritable magnetic stripe 112 to be used in different card reading systems. For example, rewritable magnetic stripe 112 may extend perpendicularly from portable device 102 for insertion into an automated teller machine (ATM). On the other hand, rewritable magnetic stripe 112 may extend parallel to portable device 102 for swiping in a point-of-sale system. Moreover, rewritable magnetic stripe 112 may be detached from portable device 102 for complete insertion into certain card reading systems. In other words, rewritable magnetic stripe 112 may correspond to a detachable magnetic stripe and/or blank magnetic-stripe card associated with portable device 102.

Once a card-based transaction is conducted using rewritable magnetic stripe 112, transaction application 104 may record the card-based transaction on portable device 102. A record (e.g., record 1 130, record n 132) of the card-based transaction may additionally be transmitted to accounting system 128 and used to manage and/or track card-based transactions on portable device 102. For example, accounting system 128 may be used to keep track of financial accounts and/or transactions. As a result, accounting system 128 may keep track of financial transactions performed using portable device 102 by obtaining financial account information from the magnetic-stripe data associated with a credit or debit card used in a financial transaction. Transaction amounts and any other information (e.g., authorization codes, transaction dates, etc.) may then be obtained from the user through portable device 102 and/or another device (e.g., a desktop computer). Records on accounting system 128 may be accessed and/or reviewed by the user using portable device 102 and/or the other device.

Figure 2A:
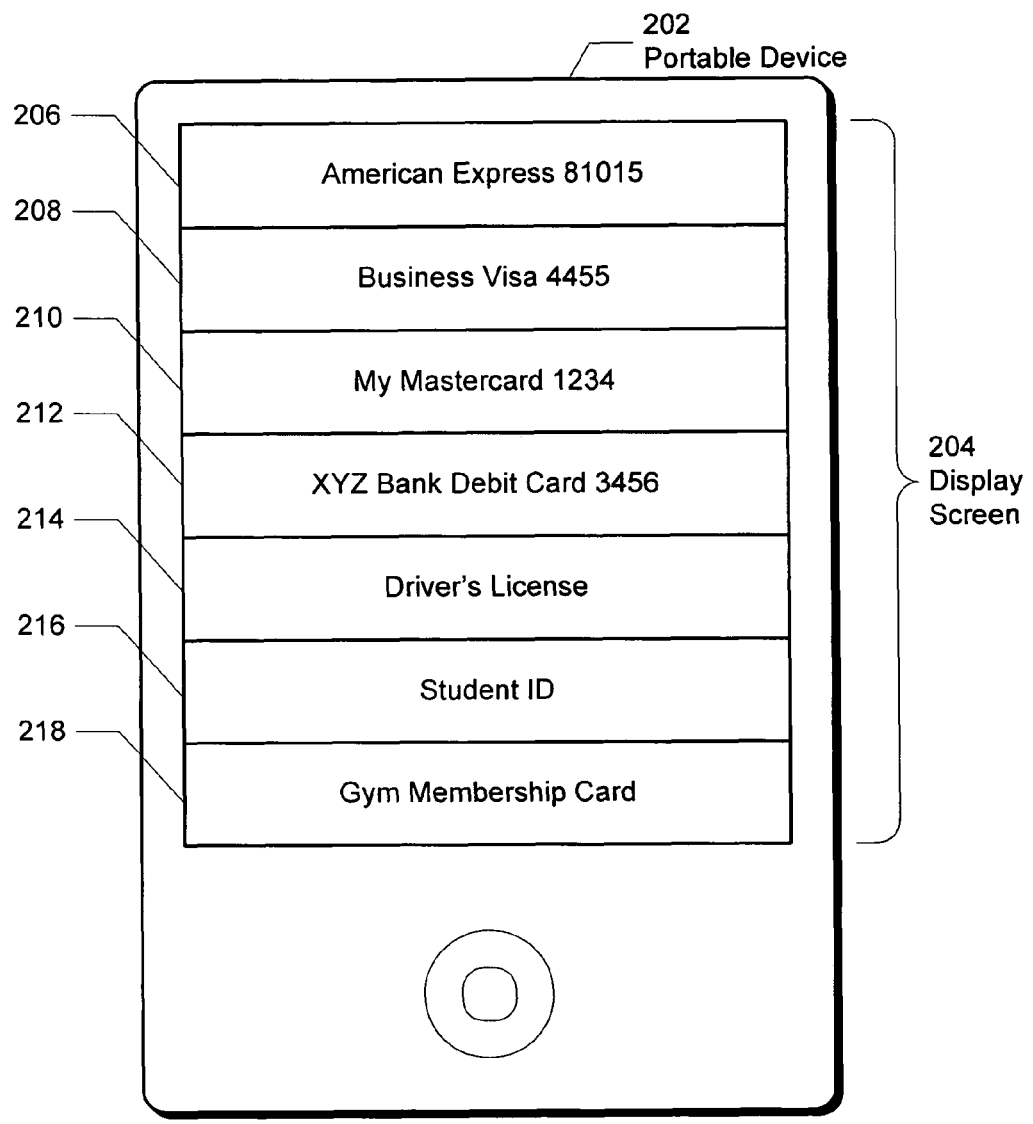
FIG. 2A shows an exemplary screenshot in accordance with an embodiment of the present invention.

FIG. 2A shows an exemplary screenshot in accordance with an embodiment of the present invention. More specifically, FIG. 2A shows a screenshot of magnetic-stripe card selection in accordance with an embodiment of the present invention. The screenshot is shown on a display screen 204 of a portable device 202. In addition, the screenshot includes a list of magnetic-stripe cards 206-218 stored on portable device 202. In other words, magnetic-stripe data for magnetic-stripe cards 206-218 may be stored on portable device 202 for use in card-based transactions in place of the physical magnetic-stripe cards. As described above, the magnetic-stripe data may be obtained from the magnetic-stripe cards using a card reader, such as card reader 116 of FIG. 1. Magnetic-stripe data from one of the magnetic-stripe cards may then be written to a rewritable magnetic stripe on portable device 202, such as rewritable magnetic stripe 112 of FIG. 1.

As shown in FIG. 2A, magnetic-stripe cards 206-218 may be used for a variety of purposes. For example, magnetic-stripe cards 206-212 may be used in business (e.g., magnetic-stripe card 208) and/or personal (e.g., magnetic-stripe card 210) financial transactions, magnetic-stripe cards 214-216 may be used to verify the identity of the user of portable device 202, and magnetic-stripe card 218 may be used to gain access to a restricted location, such as a gym. As a result, the user may select a different magnetic-stripe card 206-218 from display screen 204 based on the intended use of the magnetic-stripe card. In particular, magnetic-stripe card 212 (i.e., "XYZ Bank Debit Card 3456") is highlighted, indicating that a user selection of magnetic-stripe card 212 has been made. Portable device 202 may then authenticate the user prior to enabling card-based transactions using the magnetic-stripe data for magnetic-stripe card 212, as described below with respect to FIGS. 2B-2C.

Figure 2B:
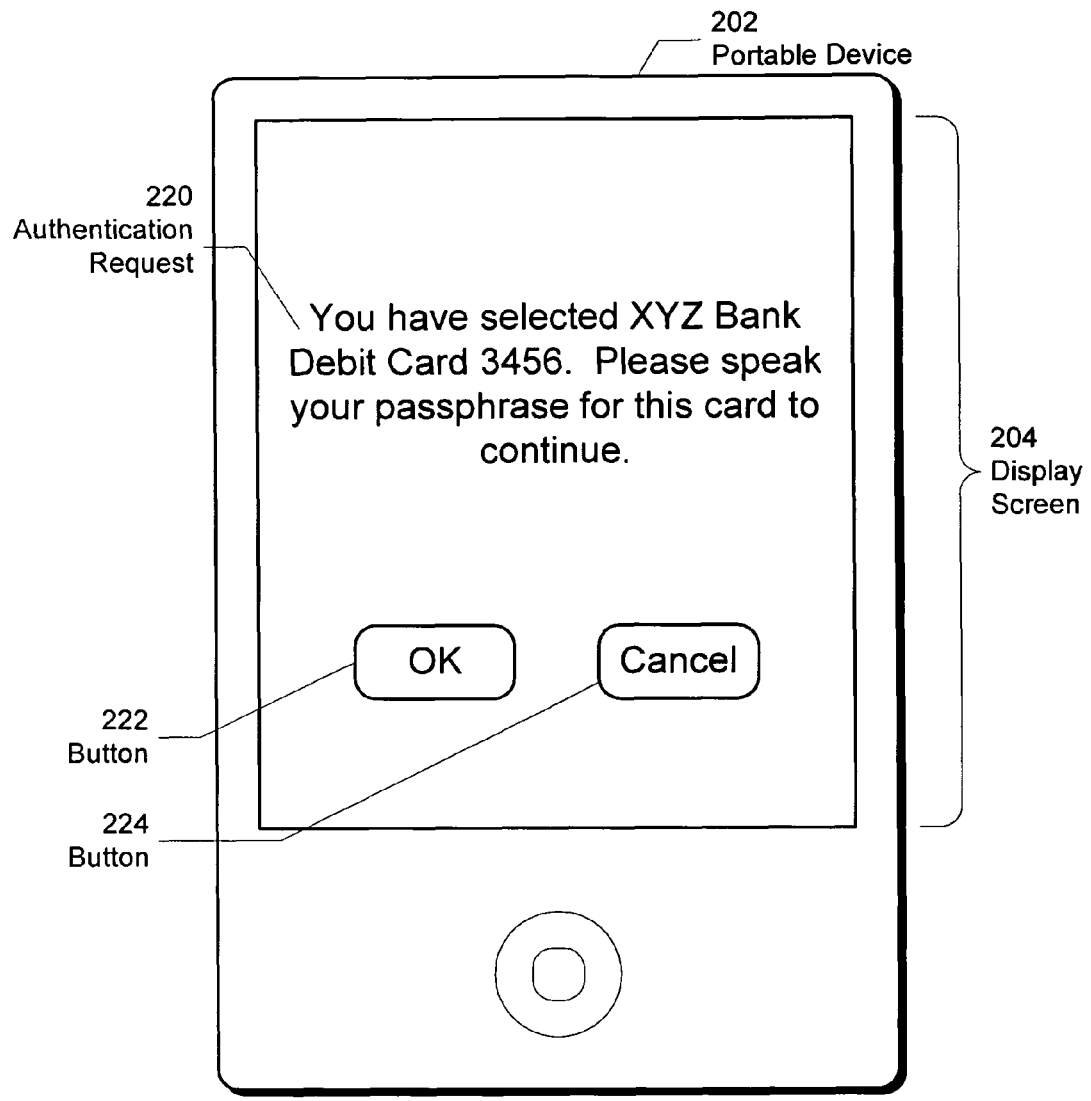
FIG. 2B shows an exemplary screenshot in accordance with an embodiment of the present invention.

FIG. 2B shows an exemplary screenshot in accordance with an embodiment of the present invention. More specifically, FIG. 2B shows a screenshot of user authentication in accordance with an embodiment of the present invention. In one or more embodiments of the invention, the screenshot of FIG. 2B is shown after the user selection of magnetic-stripe card 212 in FIG. 2A is made. In other words, display screen 204 in FIG. 2B may be used to authenticate the user prior to enabling card-based transactions using portable device 202 in place of magnetic-stripe card 212.

As shown in FIG. 2B, an authentication request 220 is displayed to the user. Authentication request 220 corresponds to a request for a verbal passphrase from the user. As a result, authentication request 220 may request an authentication factor that includes both a password (i.e., "your passphrase") and a biometric signature (i.e., the user's voice). Furthermore, authentication request 220 may be made based on a level of security associated with magnetic-stripe card 212. Because magnetic-stripe card 212 may correspond to a financial account of the user, a higher level of security may be implemented in authentication request 220. However, a user selection of a shopper savings card, for example, may prompt an authentication request that corresponds to a lower level of security, such as a request for the user's phone number or ZIP code, or no authentication at all.

After the user has provided a passphrase in response to authentication request 220, the user may select button 222 to continue. The user may also select button 224 to return to the selection screen of FIG. 2A if the user wishes to select another magnetic-stripe card or quit the application. If the user selects button 222, the user is allowed to perform card-based transactions using portable device 202 in place of magnetic-stripe card 212 if the user's identity is verified using the passphrase provided by the user.

Figure 2C:
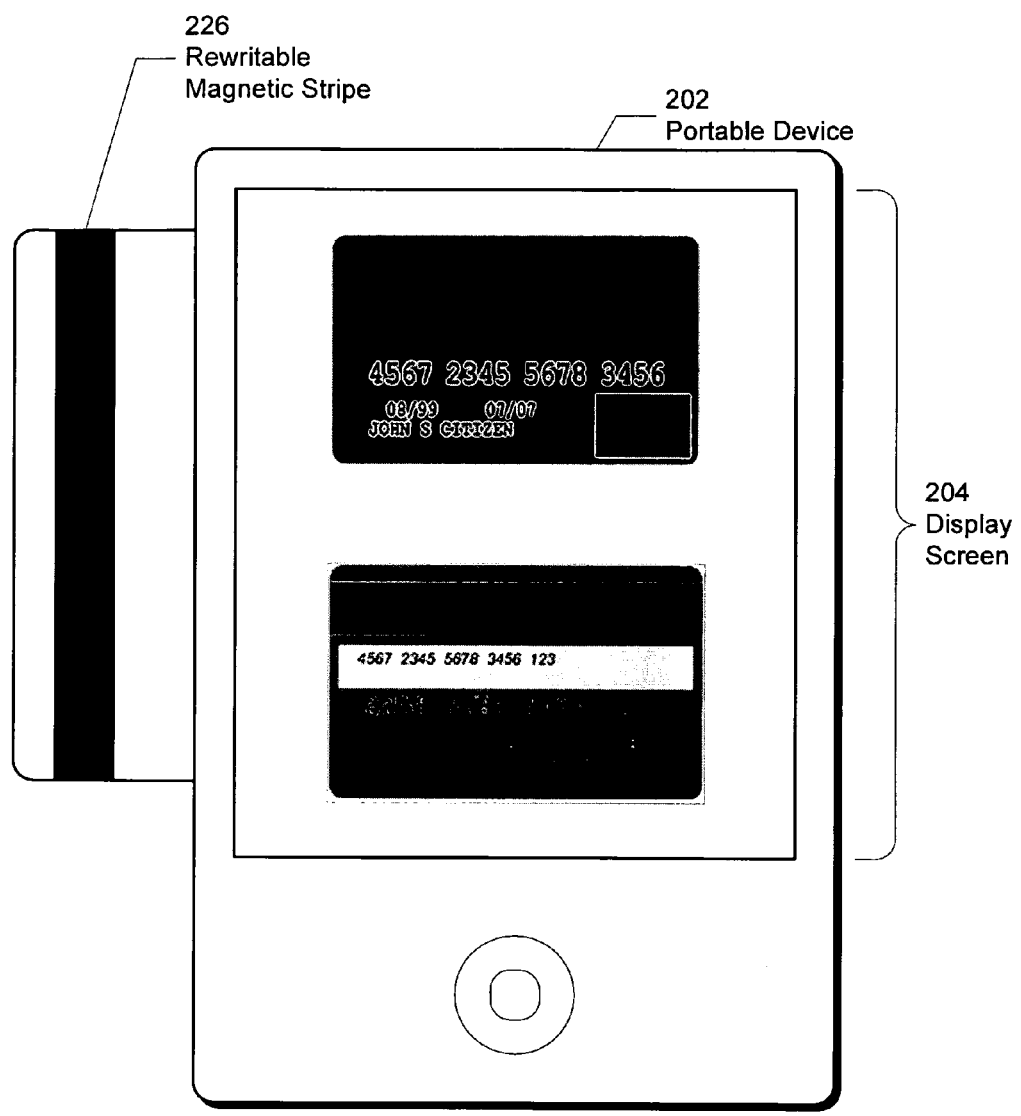
FIG. 2C shows an exemplary screenshot in accordance with an embodiment of the present invention.

FIG. 2C shows an exemplary screenshot in accordance with an embodiment of the present invention. More specifically, FIG. 2C shows a screenshot of portable device 202 enabled for use in card-based transactions in place of magnetic-stripe card 212. As shown in FIG. 2C, display screen 204 includes a visual representation of magnetic-stripe card 212. The visual representation may be obtained from an organization (e.g., financial institution) associated with magnetic-stripe card 212, uploaded and/or captured by the user using a camera on portable device 202 or another device, and/or generated using the magnetic-stripe data associated with magnetic-stripe card 212. Alternatively, the visual representation may be omitted from display screen 204 for security purposes.

In addition, a rewritable magnetic stripe 226 is extended from portable device 202. While rewritable magnetic stripe 226 is shown extended parallel to portable device 202, rewritable magnetic stripe 226 may instead be extended perpendicular to portable device 202, extended at another orientation from portable device 202, and/or detached from portable device 202 for use in various card-based transactions. Rewritable magnetic stripe 226 may additionally be repositioned by the user (e.g., from a parallel to perpendicular orientation) to accommodate different types of card-reading devices.

As mentioned previously, rewritable magnetic stripe 226 may include magnetic-stripe data corresponding to magnetic-stripe card 212. The magnetic-stripe data may be written to rewritable magnetic stripe 226 using a magnetic-stripe writer, such as magnetic-stripe writer 134 of FIG. 1. Consequently, use of rewritable magnetic stripe 226 in a card-based transaction may correspond to use of magnetic-stripe card 212 in the card-based transaction. Rewritable magnetic stripe 226 may thus reduce the need for the user to physically carry magnetic-stripe card 212 and/or other magnetic-stripe cards by emulating the magnetic-stripe cards in card-based transactions.

After rewritable magnetic stripe 226 is ready for use, the user may perform one or more card-based transactions using rewritable magnetic stripe 226. For example, the user may purchase goods or services by swiping rewritable magnetic stripe 226 through a point-of-sale system in lieu of magnetic-stripe card 212. Once the user is finished making card-based transactions using rewritable magnetic stripe 226, rewritable magnetic stripe 226 may be retracted back into portable device 202 until rewritable magnetic stripe 226 is used again.

Figure 3:
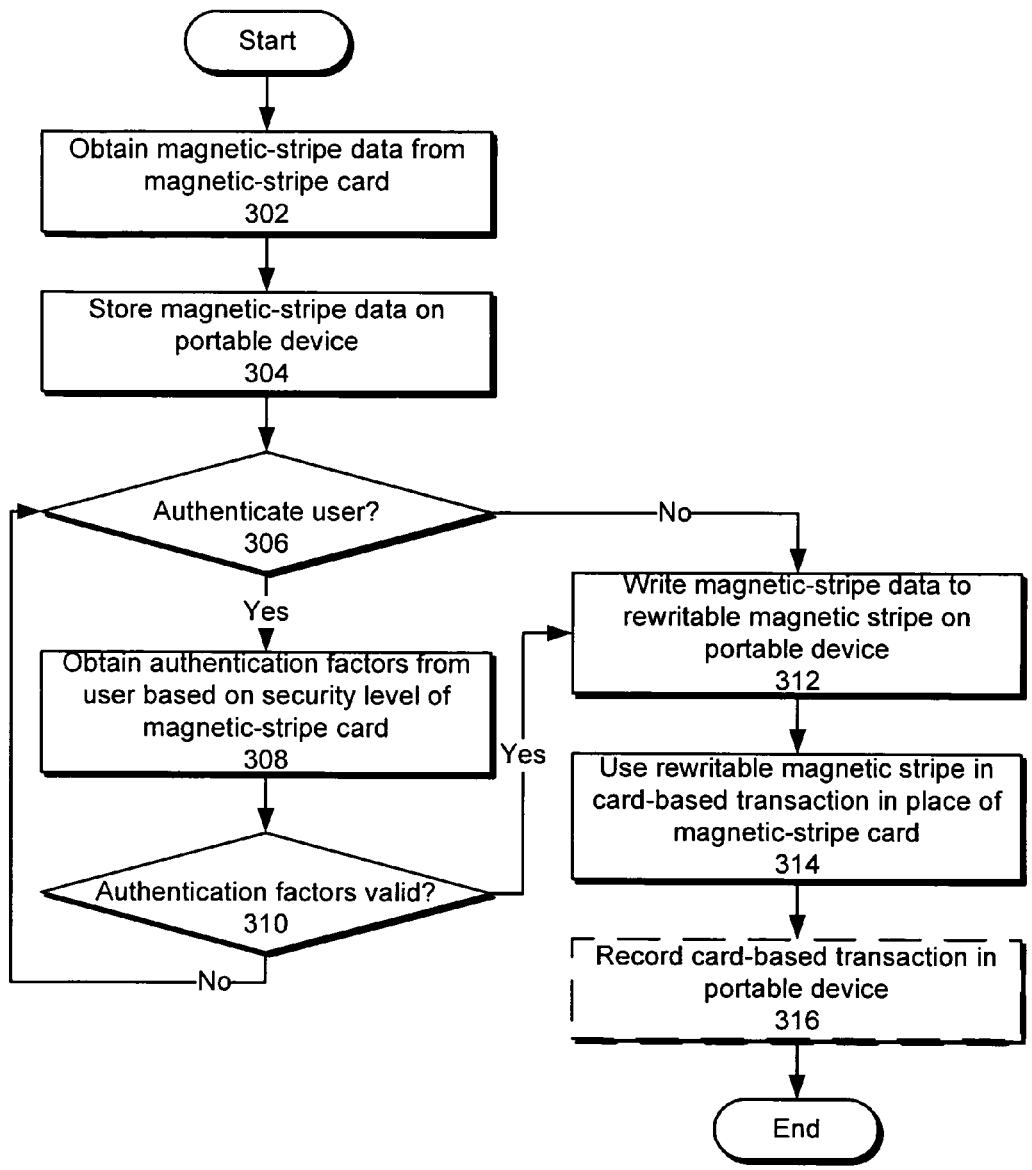
FIG. 3 shows a flowchart illustrating the process of using a portable device in place of a magnetic-stripe card in accordance with an embodiment of the present invention.

FIG. 3 shows a flowchart illustrating the process of using a portable device in place of a magnetic-stripe card in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, magnetic-stripe data is obtained from a magnetic-stripe card (operation 302). The magnetic-stripe data may be obtained by swiping the magnetic-stripe card through a card reader. The magnetic-stripe data may then be sent from the card reader to the portable device using a USB interface and/or other interface. Once the magnetic-stripe data is obtained by the portable device, the magnetic-stripe data is stored on the portable device (operation 304) for use in card-based transactions in place of the magnetic-stripe card. For example, one or more tracks on a magnetic stripe for a bankcard may be scanned by the card reader and stored on portable device.

The user may be authenticated (operation 306) prior to enabling use of the portable device in card-based transactions. As discussed above, the user may be authenticated based on a level of security associated with the magnetic-stripe card. For example, cards associated with financial institutions, workplace or security clearances, and/or other sensitive information may require a high level of security, while cards associated with merchant discounts, promotions, and/or other less sensitive information may require little to no security.

If authentication is required from the user, authentication factors are obtained from the user based on the security level of the magnetic-stripe card (operation 308). For example, a credit card may require a password and/or biometric signature, while a gift card may require the user's ZIP code. A check for validity (operation 310) of the authentication factors is then made. In particular, if the user-provided authentication factors match authentication factors for the magnetic-stripe card stored on the portable device, the user is allowed to use the portable device in card-based transactions in place of the magnetic-stripe card. If the authentication factors are invalid (i.e., do not match), the user may be reauthenticated (operation 306) and/or locked out of the portable device after a number of authentication attempts. If the user does not require authentication, the user is allowed access to card-based transactions using the portable device without obtaining authentication factors from the user.

To enable use of the portable device in card-based transactions, magnetic-stripe data corresponding to the magnetic-stripe card is written to a rewritable magnetic stripe on the portable device (operation 312). The magnetic-stripe data may be written using a magnetic-stripe writer in the portable device. The rewritable magnetic stripe may then be used in a card-based transaction in place of the magnetic-stripe card (operation 314). For example, the rewritable magnetic stripe may be swiped through a point-of-sale system, inserted into a card-reading system, and/or otherwise scanned. By providing magnetic-stripe data from the magnetic-stripe card to the scanning system, the rewritable magnetic stripe emulates the magnetic-stripe card in the card-based transaction.

Finally, the card-based transaction may optionally be recorded in the portable device (operation 316) to allow the user to track and/or manage card-based transactions from the portable device. For example, financial transactions made using the rewritable magnetic stripe may be recorded in an accounting system associated with the portable device for budget tracking and/or other accounting purposes.

Figure 4:
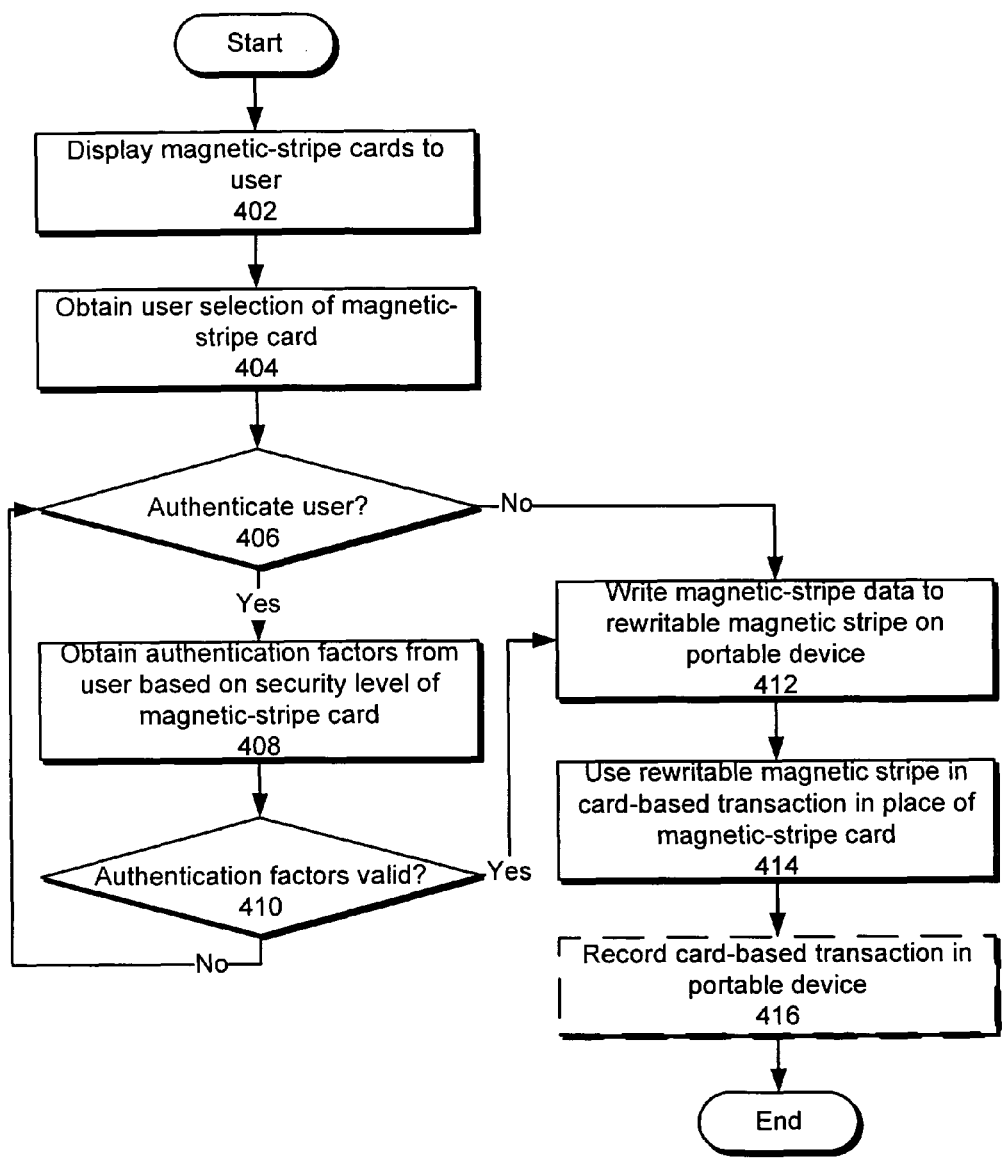
FIG. 4 shows a flowchart illustrating the process of performing a card-based transaction using a portable device in accordance with an embodiment of the present invention.

FIG. 4 shows a flowchart illustrating the process of performing a card-based transaction using a portable device in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, a set of magnetic-stripe cards is displayed to a user (operation 402) of the portable device. The magnetic-stripe cards may be displayed through a user interface of the portable device by a transaction application on the portable device, as described above. The magnetic-stripe cards may correspond to cards with magnetic stripes that have been scanned to obtain magnetic-stripe data from the cards. Furthermore, the magnetic-stripe data may be stored on the portable device for subsequent retrieval and use in card-based transactions.

A user selection of a magnetic-stripe card is then obtained (operation 404). For example, the user may select the magnetic-stripe card using an input device on the portable device, such as a button, touchpad, and/or touchscreen. After the magnetic-stripe card is selected, the user may be authenticated (operation 406) prior to enabling use of the portable device in card-based transactions in lieu of the magnetic-stripe card.

If authentication is required from the user, authentication factors are obtained from the user based on the security level of the magnetic-stripe card (operation 408). A check for validity (operation 410) of the authentication factors is then made; the user is permitted to use the portable device in card-based transactions in place of the magnetic-stripe card if the authentication factors are valid. If the authentication factors are invalid, the user may be reauthenticated and/or locked out of the portable device after a number of authentication attempts. If the user does not require authentication, the user is immediately permitted access to card-based transactions using the portable device.

To enable use of the portable device in card-based transactions, the magnetic-stripe data is written to a rewritable magnetic stripe on the portable device operation 412). The rewritable magnetic stripe is then used in one or more card-based transactions in place of the magnetic-stripe card (operation 414), and the card-based transaction is optionally recorded in the portable device (operation 416), as discussed above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a portable device, comprising:
    obtaining magnetic-stripe data from a magnetic-stripe card using a first card reader associated with the portable device;
    storing the magnetic-stripe data on the portable device;
    writing the magnetic-stripe data to a rewritable magnetic stripe on the portable device, wherein the rewritable magnetic stripe on the portable device is not detachable from the portable device and is retractable into the portable device, and wherein, relative to a display screen of the portable device, the rewritable magnetic stripe, when extended, is orientable in a direction that is one of: parallel to the display screen, perpendicular to the display screen, and at an angle that is between parallel and perpendicular to the display screen; and
    using the rewritable magnetic stripe in a card-based transaction in place of the magnetic-stripe card, wherein said using comprises:
        extending the rewritable magnetic stripe;
        re-orienting the rewritable magnetic stripe, wherein the re-oriented rewritable magnetic stripe is one of: parallel to the display screen, perpendicular to the display screen, or at an angle between parallel and perpendicular to the display screen; and
        using the re-oriented rewritable magnetic stripe in a second card reader used in the card-based transaction.

2. The method of claim 1, further comprising:
    authenticating a user of the portable device prior to enabling use of the rewritable magnetic stripe in the card-based transaction.

3. The method of claim 2, wherein the user is authenticated using at least one of a password and a biometric signature.

4. The method of claim 2, wherein the user is authenticated based on a level of security associated with the magnetic-stripe card.

5. The method of claim 1, wherein the card-based transaction comprises a financial transaction.

6. The method of claim 1, wherein the magnetic-stripe card is at least one of a credit card, a debit card, an identification (ID) card, an insurance card, a gift card, an account card, a transportation card, and a club card.

7. The method of claim 1, wherein the card reader is attached to the portable device using a Universal Serial Bus (USB) interface.

8. The method of claim 1, wherein the portable device is at least one of a mobile phone, a personal digital assistant (PDA), a global positioning system (GPS) receiver, a portable media player, a portable calculator, and a portable computer.

9. The method of claim 1, further comprising:
    recording the card-based transaction in the portable device.

10. A method for performing a card-based transaction, comprising:
    displaying a set of magnetic-stripe cards to a user through a user interface of a portable device;
    obtaining a user selection of a magnetic-stripe card from the set of magnetic stripe cards;
    writing magnetic-stripe data associated with the magnetic-stripe card to a rewritable magnetic stripe on the portable device, wherein the rewritable magnetic stripe on the portable device is not detachable from the portable device and is retractable into the portable device, and wherein, relative to a display screen of the portable device, the rewritable magnetic stripe, when extended, is orientable in a direction that is one of: parallel to the display screen, perpendicular to the display screen, and at an angle that is between parallel and perpendicular to the display screen; and using the rewritable magnetic stripe in the card-based transaction in place of the magnetic-stripe card, wherein said using comprises:

extending the rewritable magnetic stripe;

re-orienting the rewritable magnetic stripe, wherein the re-oriented rewritable magnetic stripe is one of: parallel to the display screen, perpendicular to the display screen, or at an angle between parallel and perpendicular to the display screen; and using the re-oriented rewritable magnetic stripe in a first card reader used in the card-based transaction.

11. The method of claim 10, further comprising:
authenticating the user prior to enabling use of the rewritable magnetic stripe in the card-based transaction.

12. The method of claim 11, wherein the user is authenticated using at least one of a password and a biometric signature.

13. The method of claim 11, wherein the user is authenticated based on a level of security associated with the magnetic-stripe card.

14. The method of claim 10, wherein the magnetic-stripe data is obtained from the magnetic-stripe card using a second card reader associated with the portable device.

15. The method of claim 14, wherein the second card reader is attached to the portable device using a Universal Serial Bus (USB) interface.

16. The method of claim 10, wherein the card-based transaction comprises a financial transaction.

17. The method of claim 10, wherein the magnetic-stripe card is at least one of a credit card, a debit card, an identification (ID) card, an insurance card, a gift card, an account card, a transportation card, and a club card.

18. The method of claim 10, wherein the portable device is at least one of a mobile phone, a personal digital assistant (PDA), a global positioning system (GPS) receiver, a portable media player, a portable calculator, and a portable computer.

19. A portable device capable of performing a card-based transaction, comprising:

a magnetic-stripe repository comprising magnetic-stripe data from a set of magnetic-stripe cards;

a rewritable magnetic stripe, wherein the rewritable magnetic stripe on the portable device is not detachable from the portable device and is retractable into the portable device, and wherein, relative to a display screen of the portable device, the rewritable magnetic stripe, when extended, is orientable in a direction that is one of: parallel to the display screen, perpendicular to the display screen, and at an angle that is between parallel and perpendicular to the display screen;

a transaction application in the device configured to:
display the set of magnetic-stripe cards to a user; and
obtain a user selection of a magnetic-stripe card from the set of magnetic stripe cards;

a magnetic-stripe writer configured to write magnetic-stripe data corresponding to a magnetic-stripe card from the set of magnetic-stripe cards to the rewritable magnetic stripe; and a positioning mechanism configured to:
extend the rewritable magnetic stripe;
re-orient the rewritable magnetic stripe, wherein the reoriented rewritable magnetic stripe is one of: parallel to the display screen, perpendicular to the display screen, or at an angle between parallel and perpendicular to the display screen; and use the re-oriented rewritable magnetic stripe in a first card reader used in the card-based transaction, wherein the rewritable magnetic stripe is capable of being used in the card-based transaction in place of the magnetic-stripe card.

20. The system of claim 19, further comprising:
a second card reader configured to obtain the magnetic-stripe data from the set of magnetic-stripe cards.

21. The system of claim 20, wherein the second card reader is attached to the portable device using a Universal Serial Bus (USB) interface.

22. The system of claim 19, wherein the card-based transaction comprises a financial transaction.

23. The system of claim 19, wherein the magnetic-stripe card is at least one of a credit card, a debit card, an identification (ID) card, an insurance card, a gift card, an account card, a transportation card, and a club card.

24. The system of claim 19, wherein the portable device is at least one of a mobile phone, a personal digital assistant (PDA), a global positioning system (GPS) receiver, a portable media player, a portable calculator, and a portable computer.

25. The portable device of claim 19, wherein the transaction application is further configured to:
authenticate the user prior to enabling use of the rewritable magnetic stripe in the card-based transaction.

26. A non-transitory computer-readable storage medium storing instructions that are executed by a portable device during a card-based transaction, the instructions comprising:

instructions for displaying a set of magnetic-stripe cards to a user through a user interface of a portable device;

instructions for obtaining a user selection of a magnetic-stripe card from the set of magnetic stripe cards;

instructions for writing magnetic stripe data associated with the magnetic-stripe card to a rewritable magnetic stripe on the portable device, wherein the rewritable magnetic stripe on the portable device is not detachable from the portable device and is retractable into the portable device, and wherein, relative to a display screen of the portable device, the rewritable magnetic stripe, when extended, is orientable in a direction that is one of: parallel to the display screen, perpendicular to the display screen, and at an angle that is between parallel and perpendicular to the display screen; and wherein the rewritable magnetic stripe is capable of being used in the card-based transaction instead of the magnetic-stripe card, and wherein the rewritable magnetic stripe is capable of being re-oriented relative to the display screen before being used in the card-based transaction, wherein the re-orientation comprises one of: being parallel to the display screen, being perpendicular to the display screen, or being at an angle between parallel and perpendicular to the display screen.

27. The computer-readable storage medium of claim 26, the instructions further comprising:

instructions for authenticating the user prior to enabling use of the rewritable magnetic stripe in the card-based transaction.

28. The computer-readable storage medium of claim 27, wherein the user is authenticated based on a level of security associated with the magnetic-stripe card.

29. The non-transitory computer-readable storage medium of claim 28, wherein the user is authenticated using at least one of a password and a biometric signature.

30. The system of claim 27, wherein the user is authenticated using at least one of a password and a biometric signature.

31. The system of claim 27, wherein the user is authenticated based on a level of security associated with the magnetic stripe card.

32. The non-transitory computer-readable medium of claim 26, wherein the card-based transaction comprises a financial transaction.

33. The non-transitory computer-readable medium of claim 26, wherein the magnetic-stripe card is at least one of a credit card, a debit card, an identification (ID) card, an insurance card, a gift card, an account card, a transportation card, and a club card.

34. The non-transitory computer-readable medium of claim 26, wherein the portable device is at least one of a mobile phone, a personal digital assistant (PDA), a global positioning system (GPS) receiver, a portable media player, a portable calculator, and a portable computer.

35. The computer-readable medium of claim 26, the instructions further comprising:
   instructions for recording the card-based transaction in the portable device.

* * * * *